United States Patent [19]
Ruuskanen

[11] Patent Number: 5,812,835
[45] Date of Patent: Sep. 22, 1998

[54] METHOD AND SYSTEM FOR AUTOMATIC COMPENSATION OF LINE DELAY IN A CLOCK DISTRIBUTION SYSTEM

[75] Inventor: Markku Ruuskanen, Porvoo, Finland

[73] Assignee: Nokia Telecommunications Oy

[21] Appl. No.: 782,925

[22] PCT Filed: Jul. 10, 1995

[86] PCT No.: PCT/FI95/00400

§ 371 Date: Jan. 13, 1997

§ 102(e) Date: Jan. 13, 1997

[87] PCT Pub. No.: WO96/02877

PCT Pub. Date: Feb. 1, 1996

[30] Foreign Application Priority Data

Jul. 13, 1994 [FI] Finland ..................... 943341

[51] Int. Cl.⁶ ........................................... G06F 1/12
[52] U.S. Cl. ............................. 395/558; 395/557
[58] Field of Search ........................ 395/551, 552, 395/557, 558

[56] References Cited

U.S. PATENT DOCUMENTS 5,298,866  3/1994  Kaplinsky .
5,361,277  11/1994  Grover ........................ 375/107

FOREIGN PATENT DOCUMENTS 1 301 261  5/1992  Canada .

Primary Examiner—Thomas M. Heckler
Attorney, Agent, or Firm—IP Group of Pillsbury Madison & Sutro LLP

[57] ABSTRACT

The invention relates to a method and system for automatic compensation of line delay in a clock distribution system which comprises a clock signal generator which supplies a master clock signal through a clock path to a number of decentralized clock signal buffers. According to the invention, the system further comprises a counter, or a similar device, which measures the propagation time of a measuring signal from the corresponding clock signal buffer to the end of the line and back.

13 Claims, 1 Drawing Sheet

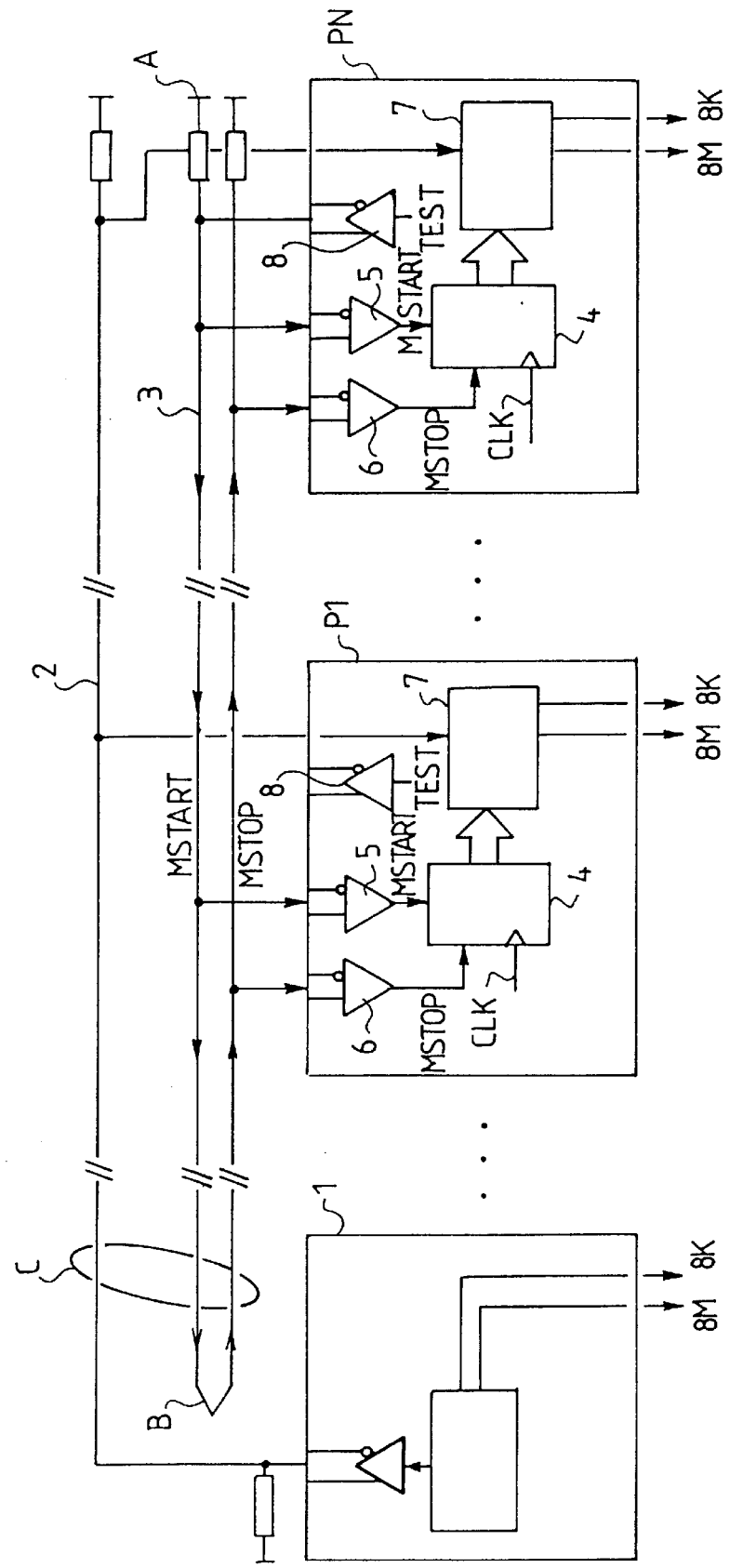

METHOD AND SYSTEM FOR AUTOMATIC COMPENSATION OF LINE DELAY IN A CLOCK DISTRIBUTION SYSTEM

This application is the national phase of international application PCT/FI95/00400, filed Jul. 10, 1995 which designated the U.S.

FIELD OF THE INVENTION

The present invention relates to a method and system for automatic compensation of line delay in a clock distribution system in which a clock generator distributes a master clock signal on clock path to a group of decentralized clock signal buffers.

BACKGROUND OF THE INVENTION

In a digital switching exchange, for example, there are a number of decentralized computer units which communicate with one another on a synchronous data transmission bus. On a synchronous bus, computer units connected to it must be synchronized with regard to one another by timing signals. As far as the operation of the data transmission bus is concerned, the aim is to distribute timing signals so that the clock signals arrive at each computer unit with substantially the same phase, or so that the clock signals have a desired phase difference.

In the distribution system of timing, i.e. clock signals, a centralized clock signal generator produces a so-called master clock signal which is distributed via one or more cabling routes to clock signal buffers which handle the distribution of clock signals to one or more decentralized computer units.

Clock signal buffers on the same clock distribution path are located at different line lengths from the clock signal generator that distributes the clock signal. In such a clock distributing system, the phase of the output clock pulse must be adjusted in each buffer so that it compensates the delay between the buffer and the clock signal generator which distributes a master clock signal to the buffer, which delay is caused by a specific cable length between them. Following the delay compensation, the clock signals received by different computers are with the same phase, or a desired time difference has been set between them.

The line delay does not have to be compensated in the clock signal distribution, if lines of fixed length are used between the clock signal buffers and the clock signal generator.

If lines of fixed length are used, buffers cannot be connected in parallel to the same clock path, but clock distribution has to carried out to each buffer on their respective cables whereupon the cables form a star-like figure.

A manual method represents one way for compensating the clock phase. In such a case, a phase preset is manually set for each clock signal buffer, the value of which depends on the length of the line section between the generator transmitting the master clock signal, and the buffer. The buffer is informed of the required buffer-specific phase preset value by, for example, back end terminals or bridge connections. A manual setting of a phase preset value like this is trying, and a high possibility exists for erroneous settings that are difficult to notice, especially if the number of required phase preset values is large for reasons of accuracy.

Another known method for carrying out compensation is to carry it out at the master clock end of the clock path. Such a system is described in the U.S. Pat. No. 5,298,866. In said patent, parallel to each clock distribution path leading from the clock distribution circuit to the buffer, a separate return path is connected to the clock distribution path just prior to the buffer. The clock distribution circuit includes a loop comprising a delay element, which loop is also fed with a clock signal, and thus the delayed clock signal acts as a reference signal. The logic compares the phase of return signals from the various clock distribution paths to the phase of the reference signal, and dynamically adjusts the phase of each outward clock signal so that it matches the phase of the reference signal. This method is restricted to be utilized in a star-like clock distribution system in which clock paths are of different lengths.

The Canadian Patent CA-1 301 261, Grover, describes carrying out compensation in a case in which the application modules to be synchronized are on the same clock distribution path. A special feature in the described method is that compensation is independently carried out in each module connected to the path. Each module comprises a PLL clock signal generator which is locked onto the same, common time reference. The arrangement goes as follows: the master clock at the other end of the path transmits clock pulses to the down signal path. Parallel to the path, there is a return signal path. The path ends that are far from the master clock are connected to each other, and the end of the return path at the master clock end is so terminated that no reflections take place. Each module is connected to the down path and the return path at the same point. As the master clock transmits a clock pulse to the down path, the module detects the edge of the pulse upon its arrival at the module. The pulse proceeds to the end of the down path, and returns on the return path towards the master clock. The module detects the edge of the pulse upon its arrival at the module. Now, the module knows the exact time interval between the outward and return signals. One half of this time corresponds to the distance in time at which the module is located from the end of the paths. Thus, each module knows the distance in time at which it is located from the end of the paths. As a new clock pulse passes each module, the modules, as a response to the passing, generate a synchronizing pulse to their respective clock distribution circuits after exactly one half of the time measured by said module. The clock pulse has at that stage proceeded to the end of the down path. Thus, each module generates a synchronizing pulse at exactly the same moment of time. This way, the clock of each module is locked onto the same time reference, i.e. the moment at which the clock pulse from the master clock has proceeded to the end of the down path.

As the clock pulse returns on the return path, the module measures the time interval between the down and return pulses, and as the next clock pulse has bypassed the module after one half of said time, generates yet another synchronizing pulse. The aforementioned is repeated continuously, and the synchronizing pulse of the module clock circuit is always updated when the pulse from the master clock reaches the end of the down path.

The disadvantage of the method used in said Canadian patent is that each module measures the propagation delay of the master clock pulse between the module and the end of the clock path. The delay between the master clock and the module is not established, and thus the phase of the master clock pulse is not found out, i.e. the moment at which the master clock transmits the clock pulse is not detected. There are embodiments, however, in which it is wished that the time of the module is exactly the same as that of the master clock without the delay, or the time of the master clock added by an arbitrary delay. If the time of the module is the same as that of the master clock, the module clock should anticipate the arrival of the pulse from the master clock by the delay caused by the distance between the module and the master clock. This is not possible by the method of said patent.

BRIEF SUMMARY OF THE INVENTION

The object of the present invention is to provide a method by which the actual delay caused to the clock signal by the line between the master clock generator and the buffer can be measured in a decentralized clock distribution system, and automatically compensate the delay in each clock signal buffer accordingly, so that all buffers transmit a clock signal with the same phase or of a desired phase relationship with respect to the other buffers.

It is characteristic to the method of the invention that the phases are synchronized into the phase of the master clock generator, and that in the synchronizing process:

- each buffer is connected to a line which is at least the length of a clock path, the beginning of which line is close to the master clock generator of the clock path,
- each buffer independently measures a variable which is proportional to the length of the line section between it and the beginning of the line, and on the basis of that determines the propagation time of the signal on that section of the line, and
- each buffer sets a phase preset value for the phase of the outward clock signal, which preset value corresponds to said propagation time.

The variable to be measured may be the impedance of the line section, on the basis of which impedance the buffer measures the propagation time of the signal, or the variable is the phase difference on the cable between the measuring signal travelling from the buffer to, the direction of the master clock generator and a measuring signal returning back from there. The line can therefore be a single line, in which case the returning measuring signal is a reflected signal, or the line can be a loop.

In the method of the invention, all clock signal buffer set their respective phase preset values which depend on the line length. Thus, the phase preset value does not have to be manually set, and the lengths of the lines to be used can be freely chosen. The expression clock signal buffer derives from the method of producing a clock pulse from an incoming clock signal by buffering, but the invention is applicable to all techniques that generate an output clock signal from an incoming clock signal by way of, for example, a phase-locked loop. Thus, the term buffer is here used in an exemplary sense without being restricted in any way to the buffering technology of this invention.

The present invention makes it possible to set the phase preset value very accurately, because the setting is based on a (system-specific) measurement result.

What is later set forth in the attached claims is characteristic to the system of the invention and other preferred embodiments.

BRIEF DESCRIPTION OF THE DRAWING

In the following, the invention will be dealt with in greater detail with reference to the accompanying drawing which illustrates the system for an automatic compensation of clock signal delays in accordance with the present invention.

DETAILED DESCRIPTION OF INVENTION

A system embodying the method of the invention for an automatic compensation of line delay in a clock signal distribution is shown in the attached figure which is an exemplary illustration of a clock signal generator and a number of clock buffers P1 ... PN of a Nokia DX 200 digital switching exchange, and a clock path cabling C between the generator and buffers. The clock path cabling begins at a clock signal generator 1 and ends at the last buffer PN on the path. In said system, the clock signal generator 1 distributes, for example, master clock signals of 16,384 MHz and 8 kHz to clock signal buffers P1 ... PN on one or more clock paths 2.

The clock signal buffer receives the master clock signals of 16,384 MHz and 8 kHz transmitted by the clock signal generator 1, and, by means of them, produces 8,192 MHz and 8 kHz output clock signals of its own for buffers using the exchange clocks. The buffers produce their output clock signals from the incoming clock signal by means of buffering or by re-generating the clock signal by a phase-locked loop. The object is to transmit the clock signals from all the buffers P1 .. PN to the buffers using the exchange clocks with as much the same phase as possible regardless of the propagation delay caused by the clock path cabling, the delay being usually in the region of 5–6 ns/m in the signal received by the clock signal buffer. Alternatively, if the system timing so requires, a desired phase difference can be achieved between some or all of the outward clock signals from the buffers.

According to the invention, the clock signal buffer compensates the line delay by setting a suitable phase preset value for its output clock signal. The value of the necessary phase preset is determined, according to the primary embodiment of the invention, by measuring the propagation time of a separate measuring signal in the clock path cabling. Alternatively, the value of the phase preset can be determined by, for example, measurements of the cable resistance, or by another suitable method. The clock signal buffers comprise a clock transmitter 8 for carrying out measurements. The clock transmitter 8 of the buffer PN at the end of the clock path is advantageously connected to a measuring loop 3 on the clock path cabling, to which measuring loop 3 it transmits an 8 kHz measuring signal. Another, existing cable in the system, a clock path cable, for example, can serve as a measuring loop. A single measuring cable can be employed, so that instead of the returning signal from the other loop branch, a reflected echo signal is monitored. Each buffer P1 ... PN receives the signal that travels to the end B of the measuring loop as well as the measuring signal returning from it. The signal on the measuring cable is thus fed through all the buffers P1 ... PN to the end B of the measuring loop, which end B is at the clock signal generator 1, from which it is re-connected to the beginning (A) of the measuring loop through all the buffers (P1 ... PN).

A signal travelling to the end B of the measuring loop causes at gate 5 of each buffer an MSTART pulse which is fed to a counter 4. A signal returning to the beginning A of the measuring loop, in turn, causes at gate 6 an MSTOP pulse which is also fed to the counter 4. The counter 4 determines the phase difference between the signals MSTART and MSTOP as seconds by counting, during the time interval between the rising edges of the measuring signals MSTART and MSTOP, the 65,536 MHz clock signal pulses CLK produced at each buffer.

It would also be feasible within the scope of the invention to transmit a measuring signal by a separate measuring signal transmitter; it is only essential that all the clock signal buffers are able to infer their respective distances from the clock signal generator 1 by means of said signal.

The measured phase difference corresponds to the propagation time of the measuring signal from the measuring buffer to the end of the measuring loop and back from there to the measuring buffer. Each unit sets the phase preset value of the outward clock signal to one half of the measured propagation time of the measuring signal. This corresponds to the time that elapses as the output signal from the clock signal generator travels from the beginning of the clock path to the clock buffer.

Following this, the computer 7 in the clock signal buffer reads the result of the phase difference measurement from the counter 4, and sets a phase preset value corresponding to said result for the divider chain that produces output clock signals from the buffer. The phase preset value can be set within the accuracy of 15 ns for each buffer. Accuracy can be increased by increasing the clock signal frequency used in the counter.

It is obvious for a person skilled in the art that the various embodiments of the invention are not restricted to the example above, but may vary within the scope of the attached claims.

I claim:

1. A method for synchronizing the phases of clock signals transmitted from decentralized buffers, in which method decentralized buffers (P1 . . . PN) are connected to a master clock generator (1) through a common clock path (2), characterized in that the phases are synchronized into the phase of the master clock generator, and that in the synchronizing process:

each buffer is connected to a line (3) which is at least the length of a clock path, the beginning (B) of which line is close to the master clock generator (1) of the clock path (2), each buffer independently measures a variable which is proportional to the length of the line section between it and the beginning (B) of the line (3), and on the basis of that determines the propagation time of the signal on that section of the line, and each buffer sets a phase preset value for the phase of the outward clock signal, which preset value corresponds to said propagation time.

2. A method as claimed in claim 1, characterized in that the variable measured is impedance.

3. A method as claimed in claim 1, characterized in that the variable measured is phase difference, in which case a measuring signal is transmitted on the line (3) to its beginning (B) from which the measuring signal is returned back, at the location of each buffer (P1 . . . PN), the phase difference between the transmitted measuring signal and the returning measuring signal is measured, in which case the phase preset value corresponding to the propagation time is directly proportional to the measured phase difference.

4. A method as claimed in claim 3, characterized in that the propagation time of the measuring signal is measured at the location of the buffer by counting, during the time interval between the edges of the outward and the returning measuring pulses, the pulses of clock signals (CLK) produced at each buffer (P1 . . . PN).

5. A method as claimed in claim 3, characterized in that the measuring signal is transmitted from the clock signal buffer (PN) that is located at the opposite end (A) with regard to the beginning (B) of the cable or measuring loop (3).

6. A method as claimed in claim 3, characterized in that the measuring signal is transmitted to the clock signal buffers through a common measuring loop (3) whose length corresponds to the length of the clock path (2) cable.

7. A method as claimed in claim 5, characterized in that the measuring signal is transmitted from the clock signal buffer (PN) that is located at the opposite end (A) with regard to the beginning (B) of the cable or measuring loop (3).

8. A system for an automatic compensation of line delay in a clock distribution system which comprises a clock signal generator (1) which supplies a master clock signal through a clock path (2) to a number of decentralized clock signal buffers (P1 . . . PN), characterized in that the system comprises:

a line (3) corresponding to the length of the clock path, the beginning (B) of which line (3) is located close to the master clock generator (1) of the clock path (2), and to which each buffer (P1 . . . PN) is connected, measuring and determining means in each buffer, which means measure the variable which is proportional to the length of the line section between the buffer and the beginning (B) of the line (3), and on the basis of that determine the propagation time of the signal on that section of the line, adjusting means in each buffer, which adjusting means adjust a phase preset value for the phase of the outward clock signal, which value corresponds to said propagation time.

9. A system as claimed in claim 8, characterized in that the system in addition comprises a transmitter (8) for transmitting the measuring signal on the line (3) towards the beginning of the line (3).

10. A system as claimed in claim 9, characterized in that the measuring and determining means comprise a counter, or a similar device, which measures the propagation time of the measuring signal from the corresponding clock signal buffer to the end (B) of the line (3) and back.

11. A system as claimed in claim 10, characterized in that the measuring and determining means comprise means (5, 6) for producing measuring pulses (MSTART, MSTOP) from the measuring signal, and that the counter (4) is provided with means to count the time interval between the measuring pulses (MSTART, MSTOP) by counting the clock signal (CLK) pulses during the time interval between the rising edges of the measuring pulses.

12. A system as claimed in claim 9, characterized in that the transmitter of the measuring pulse forms a part of the clock signal buffer (PN) which is furthest away on the line (3) from the master clock generator.

13. A system as claimed in claim 8, characterized in that the line (3) is a measuring loop whose length corresponds to the length of the clock path (2) cabling.

* * * * *